R. DUNWODY.
AUTOMATIC TURPENTINE SEPARATOR.
APPLICATION FILED APR. 20, 1918.
1,326,039.
Patented Dec. 23, 1919.
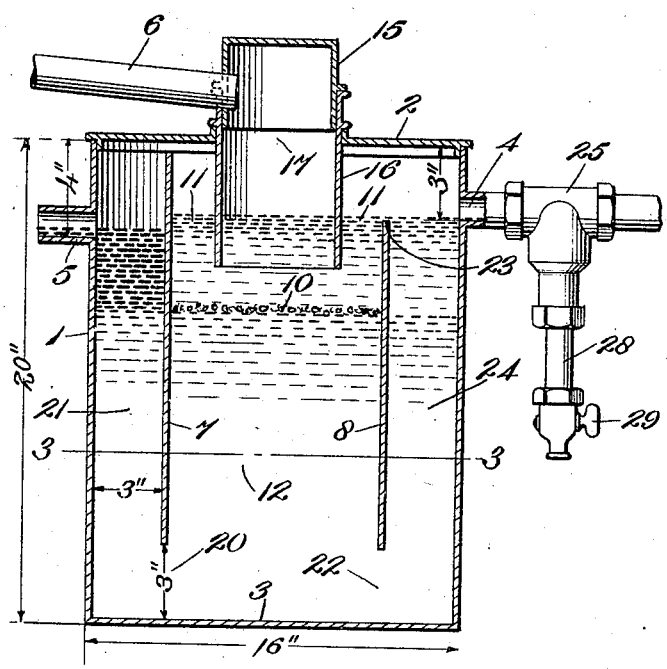
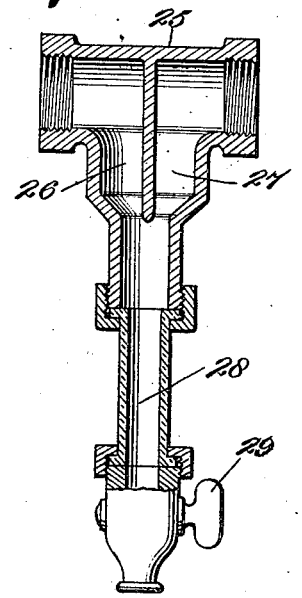
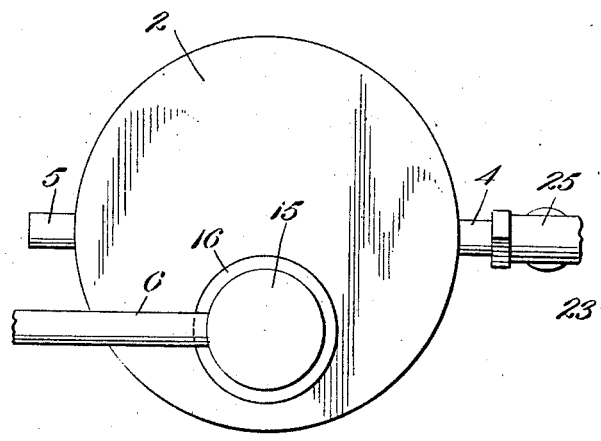
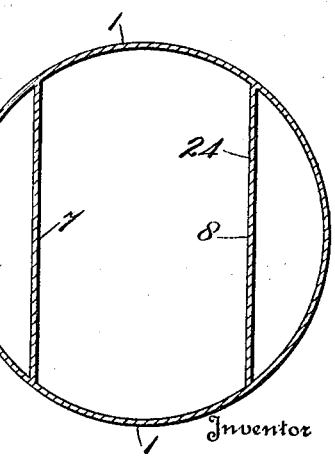
Inventor
Robson Dunwody, by
Attorney

UNITED STATES PATENT OFFICE.

ROBSON DUNWODY, OF NEW ORLEANS, LOUISIANA.

AUTOMATIC TURPENTINE-SEPARATOR.

1,326,039.  Specification of Letters Patent.  Patented Dec. 23, 1919.

Application filed April 20, 1918. Serial No. 229,820.

*To all whom it may concern:*

Be it known that I, ROBSON DUNWODY, a citizen of the United States, residing at New Orleans, in the parish of Orleans and State of Louisiana, have invented certain new and useful Improvements in Automatic Turpentine-Separators; and I do hereby declare the following to be a full, clear, and exact description of the invention, such as will enable others skilled in the art to which it appertains to make and use the same.

This invention relates to automatic turpentine separators especially adapted for use at turpentine distilleries, and has for its object to improve as well as to increase the efficiencies of the separators of this kind that have been heretofore proposed.

With these and other objects in view the invention consists in the novel details of construction and combinations of parts more fully hereinafter disclosed and particularly pointed out in the claims.

Referring to the accompanying drawings, forming a part of this specification, in which like numerals designate like parts in all the views:—

Figure 1 is a sectional view of a separator made in accordance with this invention;

Fig. 2 is a plan view of the parts shown in Fig. 1;

Fig. 3 is a sectional view taken on the line 3—3 of Fig. 1; and

Fig. 4 is a sectional view of a separating attachment.

1 indicates any suitable container provided with a cover 2 having a bottom 3, an outlet for turpentine 4, an outlet for water 5, an inlet 6 for the crude spirit, a partition 7 extending from the top 2 to near the bottom, and a partition 8 extending from the level of the outlet 4 to near the bottom 3, all as will be clear from the drawings.

As is well known, turpentine will float on water, and being substantially insoluble in it, it will float on any mixture with water that is allowed to settle for a time. But in the practical separation of the mixed turpentine and water as it comes from the still, there has always been a greater or less loss of turpentine left in the water, and more or less water has been carried over with the turpentine which later frequently caused trouble by dissolving glue, thus causing the containers to leak, by corroding metal containers, and in other well known ways giving rise to considerable losses.

Turpentine at 20° C. may be said to vary in specific gravity from say .862 to .872, averaging say .864 so that if a separator be proportioned according to the dimensions indicated in Fig. 1, it is possible to effect a clean separation from the water present, as will be disclosed below.

In the distillate as it comes from the condenser, there separates out a film of solids called "mother" which rises to form a layer 10 between the turpentine 11, and the water 12, and if it becomes saturated with water it will stay settled below the turpentine.

On the other hand, if this said "mother" 10 be stirred up it will have a tendency to float off with the turpentine, and for this reason, a very large proportion of the turpentine heretofore separated at the distilleries, prior to this invention, has been more or less contaminated with this said "mother." This objection was further somewhat aggravated by the fact that the distillate as it comes from the condenser is more or less agitated and many bubbles are formed, these contain more or less water vapor, and if not prevented, they will float off with the turpentine and "mother," and later give up their water, thus aiding in causing the above mentioned troubles.

By the employment of the present invention however, all these objections are avoided as will now be made clear.

The condenser outlet or separator inlet 6 is led directly into the funnel member 15 which has an extension 16 reaching down below the level of the turpentine 11, and therefore, substantially all the bubbles that form are confined in the space 17, and are thus isolated from the turpentine stream flowing through the outlet 4, while the accompanying water quickly settles near the bottom of the vessel 1, and the turpentine rises as indicated. The partition or baffle 7 extends above the level of the turpentine as shown, and therefore, only water can escape through the space 20 below said partition and rise in the compartment 21 to pass out the opening 5. In like manner only water can pass under the partition 8 through the space 22, and only turpentine can rise over the top edge 23 of said partition and float on top of the water in the space 24.

This action of my separator in causing only water to pass the space 22 and only turpentine to pass the edge 23 to float on said water in the space 24, constitutes an important feature of this invention for it prevents any "mother" material from entering the space 24, and it insures a clean separation of the turpentine from the water before said turpentine enters the outlet 4.

As it requires a head of about seven inches of turpentine to balance a head of six inches of water, in a separator of the dimensions indicated in Fig. 1, I locate the water outlet 5 about one inch below the turpentine outlet 4, and thus cause a steady stream of water to pass through said outlet 5, and a steady stream of turpentine to pass through said outlet 4, as long as the mixed turpentine and water flow in through the inlet 6.

Further, owing to the quiescent condition of the water 12 in the vessel 1, the line of separation between the turpentine and water is maintained about seven inches below the level of the turpentine 11, and consequently the top layer of turpentine passing the edge 23 of the partition 8 is of exceptional purity. This most desirable result is maintained throughout the operation of the apparatus for any particles of "mother" which may rise to the top of the turpentine will float to said edge 23 where they will accumulate without passing over the same, and gradually find their way back to the main layer 10 seven inches below the surface. Likewise any bubbles that may find themselves caught in the turpentine will strike said edge 23, burst and thus give up their water to the main body 12.

It thus results from this that only pure turpentine can ordinarily reach the outlet 4. But, in order to guard against any water that might by chance reach said outlet 4, I provide the attachment 25 comprising the passages 26 and 27 separated by the partition 30, below which is the settling chamber 28 closed by the cock 29. Said chamber 28 fills with turpentine, and any water that passes over readily settles to the bottom, whence it may be removed by opening the cock 29.

The funnel or members 15 and 16 are made in two parts, as shown, so that the operator may remove the member 15 to take samples of the distillate and also for the purpose of sounding the separator or for further purposes of observation.

Any suitable non-corroding material may be employed in constructing the apparatus, but I prefer wood, copper, brass or glass.

It is obvious that those skilled in the art may vary the details of construction as well as the arrangement of parts without departing from the spirit of the invention, and therefore, I do not wish to be limited to the above disclosure except as may be required by the claims.

What I claim is:—

1. In a turpentine separator the combination of a container; a baffle in said container extending from the top to near the bottom thereof, forming a space for water with one side of said container; a water outlet from said space; a second baffle in said container forming a second space adapted to accommodate water and turpentine with another side of said container; said second baffle having its upper edge located below the top of said container but above said water-outlet, and having its lower edge terminating above the bottom of said container; and a turpentine outlet from said second space located above said water outlet, substantially as described.

2. In a turpentine separator the combination of a container; a turpentine outlet; a water outlet located below said turpentine outlet; a baffle in said container associated with said water outlet, the upper edge of which extends above said turpentine outlet and the lower edge of which terminates above the bottom of said container; a second baffle in said container associated with said turpentine outlet, the upper edge of which is located slightly below said turpentine outlet and the lower edge of which also terminates above said bottom; and means to deliver mixed turpentine and water into said container between said baffles, substantially as described.

3. In a turpentine separator the combination of a container; a turpentine outlet; a water outlet located below said turpentine outlet; a baffle in said container associated with said water outlet, the upper edge of which extends above said turpentine outlet, and the lower edge of which terminates above the bottom of said container; a second baffle in said container associated with said turpentine outlet, the upper edge of which is located slightly below said turpentine outlet and the lower edge of which also terminates above said bottom; means to deliver mixed turpentine and water into said container between said baffles; and a member associated with said last named means extending into said container below said turpentine outlet adapted to receive and collect bubbles that may form from the incoming mixture, substantially as described.

4. In a turpentine separator the combination of a container; a turpentine outlet; a water outlet located below said turpentine outlet; a baffle in said container associated with said water outlet, the upper edge of which extends above said turpentine outlet, and the lower edge of which terminates above the bottom of said container; a second baffle in said container associated with said turpentine outlet, the upper edge of which is located slightly below said turpentine outlet and the lower edge of which also terminates above said bottom; means to deliver mixed turpentine and water into said container between said baffles; and an attachment associated with said turpentine outlet adapted to collect any water that may pass said last named outlet, substantially as described.

5. In a turpentine separator the combination of a container; a turpentine outlet; a water outlet located below said turpentine outlet; a baffle in said container associated wih said water outlet, the upper edge of which extends above said turpentine outlet, and the lower edge of which terminates above the bottom of said container; a second baffle in said container associated with said turpentine outlet, the upper edge of which is located slightly below said turpentine outlet and the lower edge of which also terminates above said bottom; means to deliver mixed turpentine and water into said container between said baffles; and an attachment associated with said turpentine outlet comprising an inlet and an outlet passage, a partition between said passages and a chamber for trapping any water that may pass said last named outlet, substantially as described.

6. The process of automatically separating turpentine from water admixed therewith which consists in delivering said mixed turpentine and water to a container; segregating out any bubbles that may form while permitting the water to settle at the bottom of said container and the turpentine to float on top of said water; continuously drawing off said water from below the level of said turpentine, continuously segregating out the extreme top layers of said turpentine into a compartment containing water on which said segregated turpentine floats; preventing any bubbles and impurities that may accompany said top layers from entering said compartment; and continuously drawing off the turpentine from said compartment, substantially as described.

In testimony whereof I affix my signature in presence of two witnesses.

ROBSON DUNWODY.

Witnesses:
C. H. ROBINSON, Jr.,
JOHN C. KEY.